No. 629,996. Patented Aug. 1, 1899.
J. HOLTMANN.
APPARATUS FOR MAKING PHOSPHORIC ACID.
(Application filed Nov. 12, 1897.)
(No Model.)
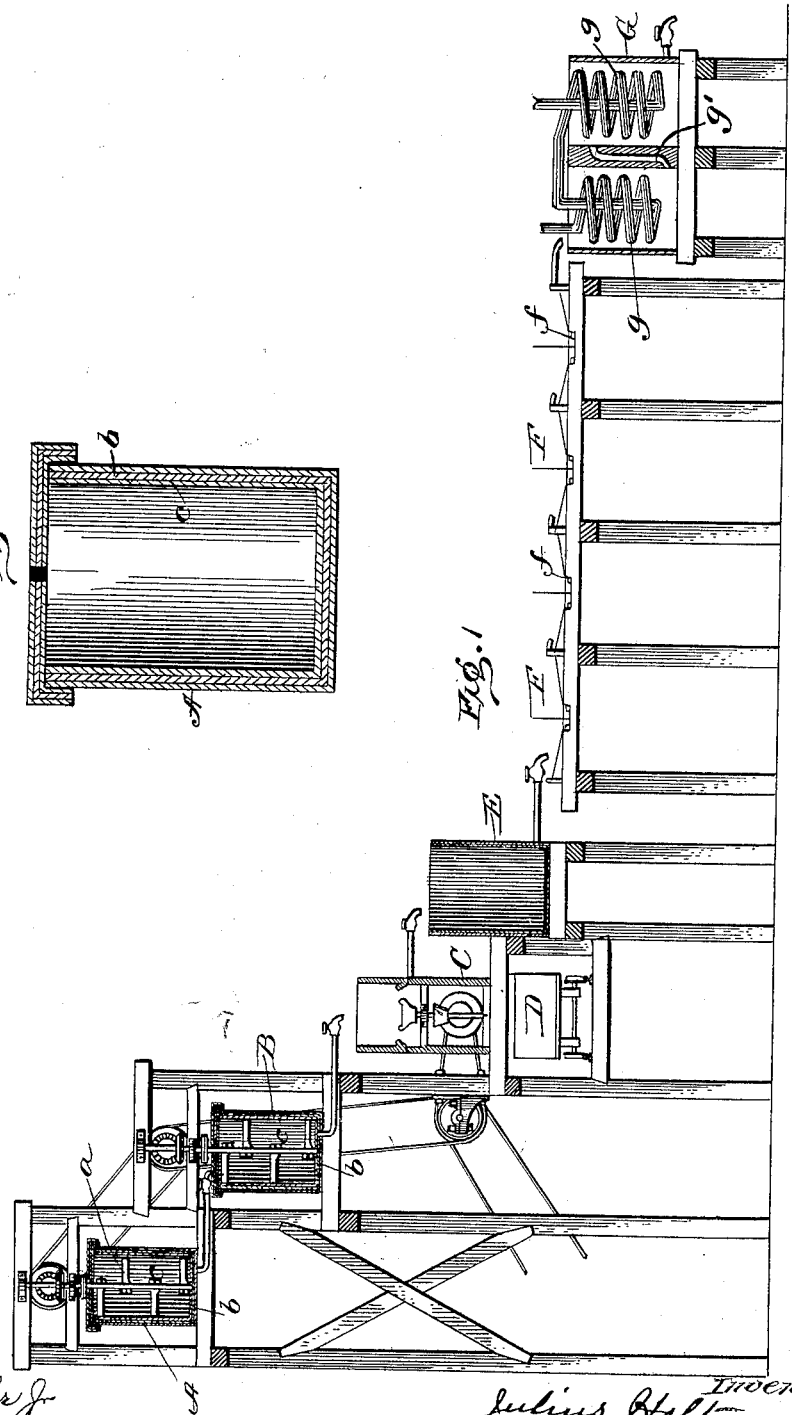
THE NORRIS PETERS CO., PHOTO-LITHO., WASHINGTON, D. C.

UNITED STATES PATENT OFFICE.

JULIUS HOLTMANN, OF BALTIMORE, MARYLAND.

APPARATUS FOR MAKING PHOSPHORIC ACID.

SPECIFICATION forming part of Letters Patent No. 629,996, dated August 1, 1899.

Application filed November 12, 1897. Serial No. 658,295. (No model.)

*To all whom it may concern:*

Be it known that I, JULIUS HOLTMANN, a citizen of the United States, residing at Baltimore, in the State of Maryland, have invented certain new and useful Improvements in Apparatus for Making Phosphoric Acid; and I do hereby declare the following to be a full, clear, and exact description of the invention, such as will enable others skilled in the art to which it appertains to make and use the same.

My invention relates to an apparatus for obtaining phosphoric acid from calcium phosphates, as will be hereinafter more specifically set forth in the specification and claim and illustrated in the drawings forming part of the specification.

Figure 1 is a sectional diagrammatical view showing the mechanism for obtaining the acid; and Fig. 2 is a vertical sectional view of one of the tanks, showing the double lining.

To obtain phosphoric acid profitably in a commercial way, the steps in the process must be carried on continuously and consecutively with the least handling and with mechanical means the most saving.

It has been found by experiment that phosphoric acid can be obtained from calcium phosphates most economically by the use of sulphuric acid. The calcium phosphate is first ground to an impalpable powder (or as nearly as possible) and a charge of suitable weight placed in a vessel of suitable size. To this charge of phosphate rock is added sulphuric acid sufficient, by weight, to displace the lime. In the reaction following the lime is converted into calcium sulphate, setting free the phosphoric acid, the water present also uniting with the phosphoric acid and forming $H_3PO_4$. We will, however, at this stage of the process usually have a portion of the phosphoric acid remaining in the lime, the remainder of the mixture being more or less impure and unconcentrated.

In order to describe more specifically the process, reference is had to the accompanying drawings, which show a side elevation of the device practically as an entirety.

The ground calcium phosphate in sufficient charges is first placed in a receptacle A, consisting of a tank or vessel lined, first, with lead $b$, then with terra-cotta $c$ or other earthenware to resist the action of the acid, as well as the abrasive action of the lime. Lead linings alone will withstand the acid; but the sharp powder quickly wears away the lead, thus requiring frequent relining, and unless frequent and careful inspection is made there will be a leak in the tank and a consequent loss of acid mixture. The terra-cotta lining effectually prevents this. This construction is shown in Fig. 2, where $a$ represents the lead lining, and $b$ the lining of terra-cotta or other ceramic material. The tank A is the primary storage and mixing tank, the mixers $a$ bringing the particles of powder and acid into an intimate relation. After a suitable time the charge is drawn off into the second mixing-chamber B, the first chamber A being refilled. The charge in the second chamber B is kept in an agitated state a sufficient time to complete the chemical reaction, and this semifluid mass is then drawn off into the centrifugal machine C, where the separation of the liquids and solids takes place. The liquid is thrown outwardly, the solids remaining within the machine. The solids are discharged at the bottom of the machine into the car D, the liquid being discharged into the tank E, from whence it is drawn off into a series of shallow tanks F, each of which is provided with a steam-coil $f$ to heat the liquid and concentrate it. From these tanks the liquid is conveyed to the cooler G, and when the temperature is sufficiently reduced the liquid phosphoric acid is drawn off and stored in suitable vessels. The tanks F will have a residue in the bottom, which residue usually contains a certain percentage of phosphoric acid, and in order to obtain this remainder I generally re-treat it in the tank A separately or by mixing it with a fresh charge of powdered phosphoric rock and sulphuric acid.

Heretofore the acid has generally been obtained in its concentrated form in one of two ways—first, the acid liquid is formed and then pumped up by specially-constructed pumps to presses, where it is freed to a greater or less degree from lime, and next it is heated and concentrated in a furnace having an over-top blaze, the acid thus containing more or less coal-dust; second, the acid is formed by the action of strong nitric acid on phosphorus; but this can only be carried on in a small way and very cautiously. It will, however, be seen that in neither way can the process be carried on step by step automatically and consecutively (as in my process) without much handling. The means employed gives control of the operation at all times and for equal amounts, and with rock whose chemical constituents are generally a constant for a given locality the amount of sulphuric acid will not vary for a given weight of powder. All these elements enter into the process as saving factors.

I have found that two men can take charge of a large plant. One takes charge of and feeds the powdered rock into the mixer A and the other removes the car containing the dephosphorized residuum, the rest of the process being automatically regulated.

Having thus described my invention, what I claim, and desire to secure by Letters Patent, is—

In an apparatus for the manufacture of phosphoric acid, the combination of an agitator A, an auxiliary agitator B, a centrifugal machine, a receiving-tank, said devices arranged serially, one below the other, a series of concentrating-tanks having heating-coils therein and a cooler G, to reduce the temperature of the liquid, the arrangement being such that the manufacture of the acid can be carried on continuously and uniformly as set forth.

In testimony whereof I affix my signature in presence of two witnesses.

JULIUS HOLTMANN.

Witnesses:
ROLLIN N. HOTCHKISS,
J. HENRY STROHMEYER.